(12) United States Patent
Williams et al.

(10) Patent No.: US 7,830,846 B2
(45) Date of Patent: *Nov. 9, 2010

(54) METHOD AND SYSTEM FOR PROVIDING FLOW DIRECTION IN A NETWORK

(75) Inventors: Carl Williams, Palo Alto, CA (US); Robert Jaksa, Irving, TX (US)

(73) Assignee: FutureWei Technologies, Inc., Plano, TX (US)

( * ) Notice: Subject to any disclaimer, the term of this patent is extended or adjusted under 35 U.S.C. 154(b) by 678 days.

This patent is subject to a terminal disclaimer.

(21) Appl. No.: 11/755,598

(22) Filed: May 30, 2007

(65) Prior Publication Data

US 2008/0253316 A1  Oct. 16, 2008

Related U.S. Application Data

(60) Provisional application No. 60/814,190, filed on Jun. 16, 2006.

(51) Int. Cl.
*H04Q 7/24* (2006.01)
(52) U.S. Cl. .................. 370/338; 370/331; 370/395.31; 455/445; 455/552.1; 455/557
(58) Field of Classification Search ................. 370/328, 370/329, 338, 395.31; 455/433, 445, 552.1, 455/557
See application file for complete search history.

(56) References Cited

U.S. PATENT DOCUMENTS 7,006,472 B1   2/2006 Immonen et al.

FOREIGN PATENT DOCUMENTS

| CN | 1592445 | 3/2005 |
|----|---------|--------|
| KR | 2005-0079407 | 8/2005 |
| WO | WO 2004/068767 | 8/2004 |

*Primary Examiner*—Temica M Beamer
(74) *Attorney, Agent, or Firm*—Slater & Matsil, L.L.P.

(57) ABSTRACT

Method and system for providing flow direction in a network. According to an embodiment, the present invention provides a method for providing network connections. The method includes providing a first host. The first host includes a plurality of interfaces. The plurality of interfaces includes at least a first interface and a second interface. The first interface is associated with at least a first application. The second interface is associated with at least a second application. The method also includes storing a plurality of records at a server. The plurality of records is associated with the first host. The plurality of records includes a first record and a second record. The first record includes at least information associated with a name of the first host, the first interface, the first application, a first address of the first interface.

29 Claims, 3 Drawing Sheets

METHOD AND SYSTEM FOR PROVIDING FLOW DIRECTION IN A NETWORK

CROSS-REFERENCES TO RELATED APPLICATIONS

This application claims priority to U.S. Provisional Application No. 60/814,190, filed Jun. 16, 2006, which is incorporated by reference herein. In addition, this application is related to U.S. Provisional Application No. 60/829,598, filed Oct. 16, 2006, which incorporated by reference.

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

The present invention relates generally to telecommunication techniques. More specifically, embodiments according to the present invention provide techniques for providing efficient data flow control for network traffics. In particular, various embodiments according to the present invention are compatible with the mobile IPv6 standard. Merely by way of example, the invention has been applied to handover techniques for mobile devices. But it would be recognized that the invention has a much broader range of applicability.

In the past decade, communication technologies rapidly developed. Various communication mediums have been explored, ranging from power line, telephone line, optical line, to wireless communication. Most recently, wireless communication has become more and more popular and widely adopted for the convenience that it offers.

Wireless communication has many applications. Among other things, mobile phones that utilize wireless communication techniques are one of the most popular communicational devices, who claim billions of users today. Another popular application using wireless communication devices is mobile computing devices accessing local networks via wireless links. Through the local wireless networks, mobile computing devices are able to connect to the Internet using wireless internet protocol (IP) technology. Most recently, standard setting organizations such as the Internet Engineering Task Force (IETF) and Institute of Electrical and Electronics Engineers (IEEE) have developed and promoted various standards for wireless communication networks. For example, the IETF has developed a Mobile IP standard, which is a communications protocol that is designed to allow mobile device users to move from one network to another while maintaining a permanent IP address. In the specification of the application, a mobile device that is in compliance with the Mobile IP standard is referred to as a mobile node (MN), which is broadly defined and should not unduly limit the scope of claims. For example, mobile node may refer to network nodes that is capable of changing location, change links (i.e., addresses), and maintain its connectives using its home address. As merely an example, a mobile can be a laptop, a PDA, etc.

According to the Mobile IP standard (e.g., more specifically the Mobile IPv6 standard), an MN can have two addresses: a permanent home address and a care of address (CoA). Typically, the permanent home address is associated with the home agent that the MN is connected, and the CoA is associated with the network the MN is visiting. For example, a home agent stores information about MN whose permanent address is in the home agent's network. For an MN to be able to connected to more than one network, the MN may have more than one CoA addresses. For example, multiple CoA (MCoA) is required for certain applications (e.g., in a handover process).

Mobile nodes are not the only entities in a Mobile IP network that have multiple CoA's. Correspondent nodes (CN) often have multiple CoA's as well. For example, a correspondent node is a node that communicates with a mobile node. It is to be understood that the terms correspondent node and CN are broadly defined, and should not unduly limit the scope of claims. For example, a CN can be an access router that provides connectivity to an MN, and the CN does not have to be compatible with the Mobile IP standard. Depending on the application, a CN may be a host, router, and other network entities that are involved in transferring data for a mobile node.

The correspondent nodes often have multiple CoA's, as each CoA is used for a specific type of service. For example, a CN has interfaces for different services (e.g., web traffic, VoIP traffic, FTP traffic, etc.) and for each of the service there is a corresponding CoA address. Typically, by having specific CoA for each of the services offered by the same CN, network traffic can be routed in an efficient manner.

Since correspondent nodes have multiple addresses for various interfaces, during a routing process it is important to determine which interface to connect and which address to use. In the past, various conventional techniques have been developed. Unfortunately, these techniques are often inadequate.

Therefore, an improved system and method for directing network traffic is desired.

BRIEF SUMMARY OF THE INVENTION

The present invention relates generally to telecommunication techniques. More specifically, embodiments according to the present invention provide techniques for providing efficient data flow control for network traffics. In particular, various embodiments according to the present invention are compatible with the mobile IPv6 standard. Merely by way of example, the invention has been applied to handover techniques for mobile devices. But it would be recognized that the invention has a much broader range of applicability.

According to an embodiment, the present invention provides a method for providing network connections. The method includes providing a first host. The first host includes a plurality of interfaces. The plurality of interfaces includes at least a first interface and a second interface. The first interface is associated with at least a first application. The second interface is associated with at least a second application. The method also includes storing a plurality of records at a server. The plurality of records is associated with the first host. The plurality of records includes a first record and a second record. The first record includes at least information associated with a name of the first host, the first interface, the first application, a first address of the first interface. The second record includes at least information associated with the second interface, the second application, a second address of the second interface. The method further includes providing a second host, the second host being configured to send a first packet data through a session interface of the first host. The first packet data is associated with at least a third application. The method also includes sending a query from the second host to the server. The query is related to determine the session interface for sending the first packet data. In addition, the method includes determining the session interface in response to the query based at least on the third application.

According to another embodiment, the present invention provides a system for providing network connections. The system includes a first host that includes a plurality of interfaces. The plurality of interfaces includes at least a first interface and a second interface. The first interface is associated with at least a first application. The second interface is associated with at least a second application. The system also includes a server that is configured to store a plurality of records. The plurality of records is associated with the first host. The plurality of records includes a first record and a second record. The first record includes at least information associated with a name of the first host, the first interface, the first application, a first address of the first interface. The second record includes at least information associated with the second interface, the second application, a second address of the second interface. The system also includes a second host that is configured to send a first packet data through a session interface of the first host. The first packet data is associated with at least a third application. The second host sends a query to the server, the query being related to determine the session interface for sending the first packet data. The server send a response to the second host, the response including information associated with at least the first host. The second host determines the session interface using based on the response.

According to yet another embodiment, the present invention provides a system for providing network connections. The system includes a first host that includes a plurality of interfaces. The plurality of interfaces includes at least a first interface and a second interface. The first interface is associated with at least a first application. The second interface is associated with at least a second application. The system also includes a server that is configured to store a plurality of records. The plurality of records is associated with the first host. The plurality of records includes a first record and a second record. The first record includes at least information associated with a name of the first host, the first interface, the first application, a first address of the first interface. The second record includes at least information associated with the second interface, the second application, a second address of the second interface. The system also includes a second host that is configured to send a first packet data through a session interface of the first host. The first packet data is associated with at least a third application. The second host sends a query to the server, the query being related to determine the session interface for sending the first packet data. The server determines the session interface in response to the query based at least on the third application using the plurality of records.

It is to be appreciated that the various embodiments of the present invention provide advantages over conventional techniques. In various embodiments, the present invention provides a scheme for efficiently routing data to corresponding interfaces of a server. In a specific embodiment, the present invention provides a method in which a DNS server determines the appropriate interfaces and address for routing data based at least on the data to be routed. In addition, it is to be appreciated that embodiments of the present invention can be implemented for conventional network techniques and standards (e.g., the Mobile IPv6 standard). For example, various embodiments of the present invention are compatible with conventional techniques and easily implemented. There are other benefits as well.

Depending upon embodiment, one or more of these benefits may be achieved. These benefits and various additional objects, features and advantages of the present invention can be fully appreciated with reference to the detailed description and accompanying drawings that follow.

DETAILED DESCRIPTION OF THE INVENTION

The present invention relates generally to telecommunication techniques. More specifically, embodiments according to the present invention provide techniques for providing efficient data flow control for network traffics. In particular, various embodiments according to the present invention are compatible with the mobile IPv6 standard. Merely by way of example, the invention has been applied to handover techniques for mobile devices. But it would be recognized that the invention has a much broader range of applicability.

As discussed above, an improved system and method for directing network traffic is desired. More specifically, it is desirable to be able to automatically determine the address to use where multiple addresses are available to a single correspondent node. In a specific embodiment, the present invention provides a technique that facilitates interface selection in under the Mobile IPv6 protocol, in which a mobile node is able to use two or more interfaces at the same time. For example, based on certain predetermined settings, one or more network entities determine as which interface should be used for which application. Among other things, the embodiment offers an intelligent load sharing and interface switching that can be achieved when sessions are initiated for the MN by one or more CN's. It is to be appreciated that under the Mobile IPv6 standard, MNs are able to control their data flows to the available connection interfaces of attachment in an efficient manner.

Figure 1:
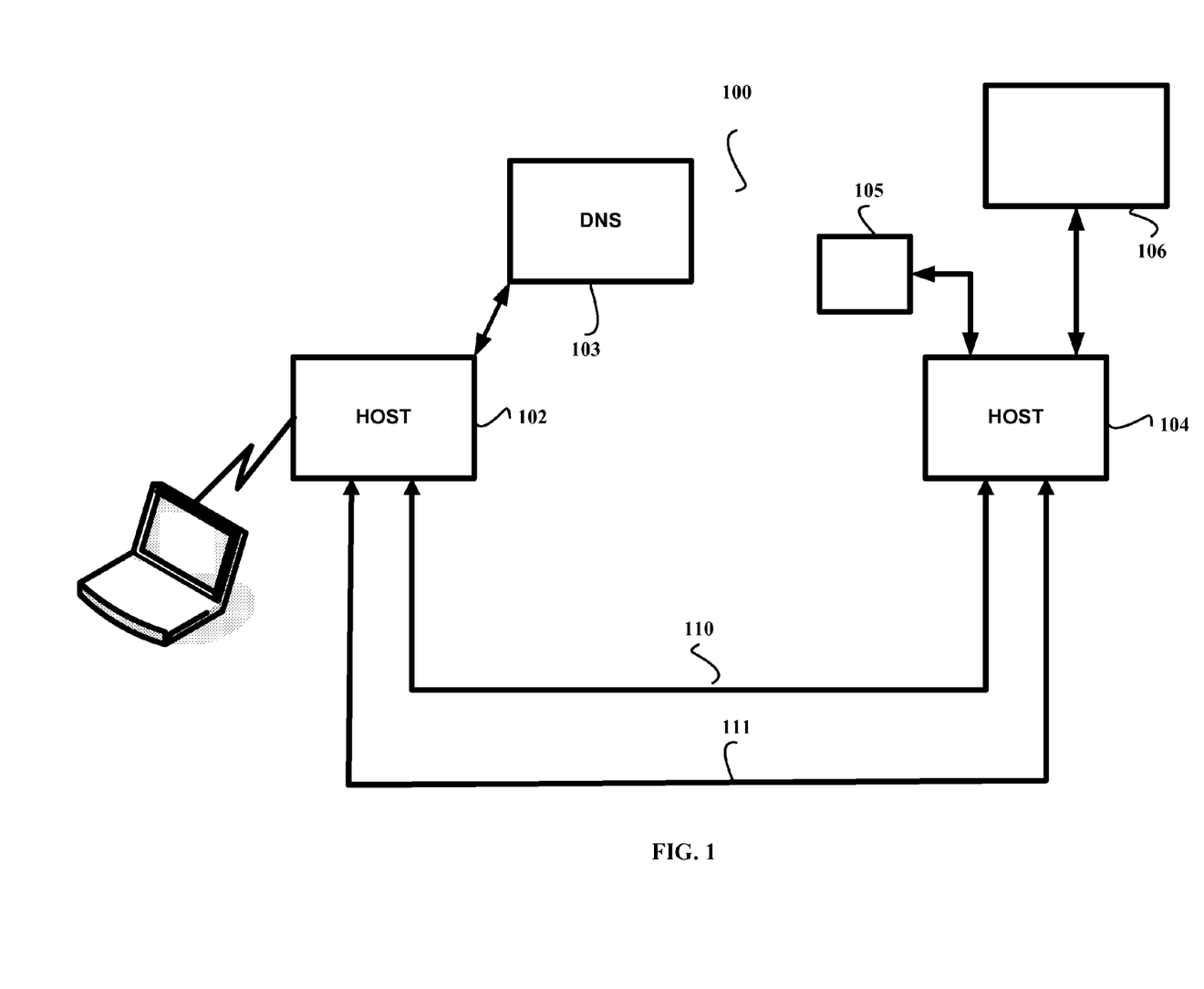
FIG. 1 is a simplified diagram illustrating an embodiment of the present invention.

FIG. 1 is a simplified diagram illustrating an embodiment of the present invention. This diagram is merely an example, which should not unduly limit the scope of the claims. One of ordinary skill in the art would recognize many variations, alternatives, and modifications.

As shown in FIG. 1, a network system 100 includes the following entities:

1. a mobile node 101;
2. hosts 102 and 104;
3. a server 103; and
4. content networks 105 and 106.

The mobile node 101, as explained above is capable of wireless connectivity and moving to different locations while maintaining its wireless connectivity. For example, the mobile node 101 is compatible with the Mobile IPv6 standard. In a specific embodiment, the mobile node includes two more communication interfaces. For example, the mobile node is able to connect to two or more interfaces using the two interfaces respectively. As shown, the mobile node 101 is wirelessly connected to the host 102. Depending on the application, the mobile node 101 may be connected to other hosts and/or routers as well.

The host 102 is configured to provide wireless and/or radio access for the mobile node 101. For example, the host 102 consists of an access router and/or a base station. In addition the host 102 may include quality of service information related to serving the mobile node 101. According to a specific embodiment, the host 102 is configured to provide IP connection to the mobile node 101 in compliance with the Mobile IPv6 standard. For example, the host 102 is a correspondent node that includes multiple interfaces and/or addresses, each of which being used for a specific type of service. In addition, for each type of service there may be one or more ports for that service.

The host 102 is connected to, as shown the host 104. For example, both the host 102 and the host 104 are correspondent nodes in accordance with the Mobile IPv6 standard. The host 104 has multiple interfaces and corresponding addresses for each of the interfaces. For example, the host 104 has a file transfer protocol (FTP) interface that allows it to communicate the network 105 for FTP related data transfers. The interface between the host 104 and the network 105 is associated with an IP address. For example, the IP address is one of the multiple CoA for the host 104. When FTP related data transfer is performed at the host 104, the FTP address for the host 104 is used. In addition to the address itself, the FTP related services and/or transfers are also associated with one or more ports. For example, multiple FTP transfers may be performed at the host, and each of the transfers is associated with a specific port.

Similarly, the host 104 uses an address, which is different from the address used for communicating with the network 105, to interface with the network 106. For example, the interface between the host 104 and the network 106 is for VoIP data communication. The hosts 104, in accordance with the Mobile IPv6 standard, uses separate addresses for different applications (e.g., FTP and VoIP), thereby allow more efficient and scalable data connection.

It is to be understood that the host 104 may have additional interfaces and corresponding address than the ones described above. For example, host 104 may have addresses for web traffic, real time audio, etc. For each of the address there can be one or more port numbers. The information related to various addresses and applications thereof are stored by the server 103. According to a specific example, the server 103 is a domain name server in compliance with the Mobile IPv6 standard. But it is understood that the server 103 may be other types of server that stores various types of information related to hosts and/or correspondent nodes. In a specific embodiment, the server 103 includes a database that stores specific information for, among other things, hosts 102 and 104. For example, the server 103 stores records as shown in Table 1.

TABLE 1

| host 102 | FTP application | ports 1-27 | 128.128.128.1 | misc. |
| host 102 | web application | ports 28-64 | 128.128.128.2 | misc. |
| host 102 | VoIP application | ports 65-126 | 128.128.128.3 | misc. |
| host 104 | FTP application | ports 1-27 | 129.128.128.1 | misc. |
| host 104 | web application | ports 28-64 | 129.128.128.2 | misc. |
| host 104 | VoIP application | ports 65-126 | 129.128.128.3 | misc. |

According to embodiments, hosts 102 and 104 send information (e.g., address, application, address, etc.) to the server 103 when they establish connection to the server 103 and/or to the network. For example, host 102 sends records such as these shown in Table 1 when the host 102 connects to the server 103. During the operation of the network system 100, the records stored at the server 103 may be added, removed, modified, etc. The names of hosts as shown in Table 1 are fully qualified domain names (FQDN), As an example, an FQDN is an unambiguous domain name that specifies the node's position in the DNS tree hierarchy absolutely.

The host 102 and the host 104 are connected by two or more interfaces. For example, as shown in FIG. 1, the hosts 102 and 104 are connected via the interface 110 and the interface 111. For example, the interface 110 connects between the FTP addresses of the hosts 104 and 102 while the interface 111 connects between the web address of the hosts 104 and 102. Depending on the application, additional interfaces may exist between the two hosts.

As the host 102 transfers data for the mobile 101, the host 102 needs to know as which interface to use. According to an embodiment, a process of choosing interfaces is provided below.

Figure 2:
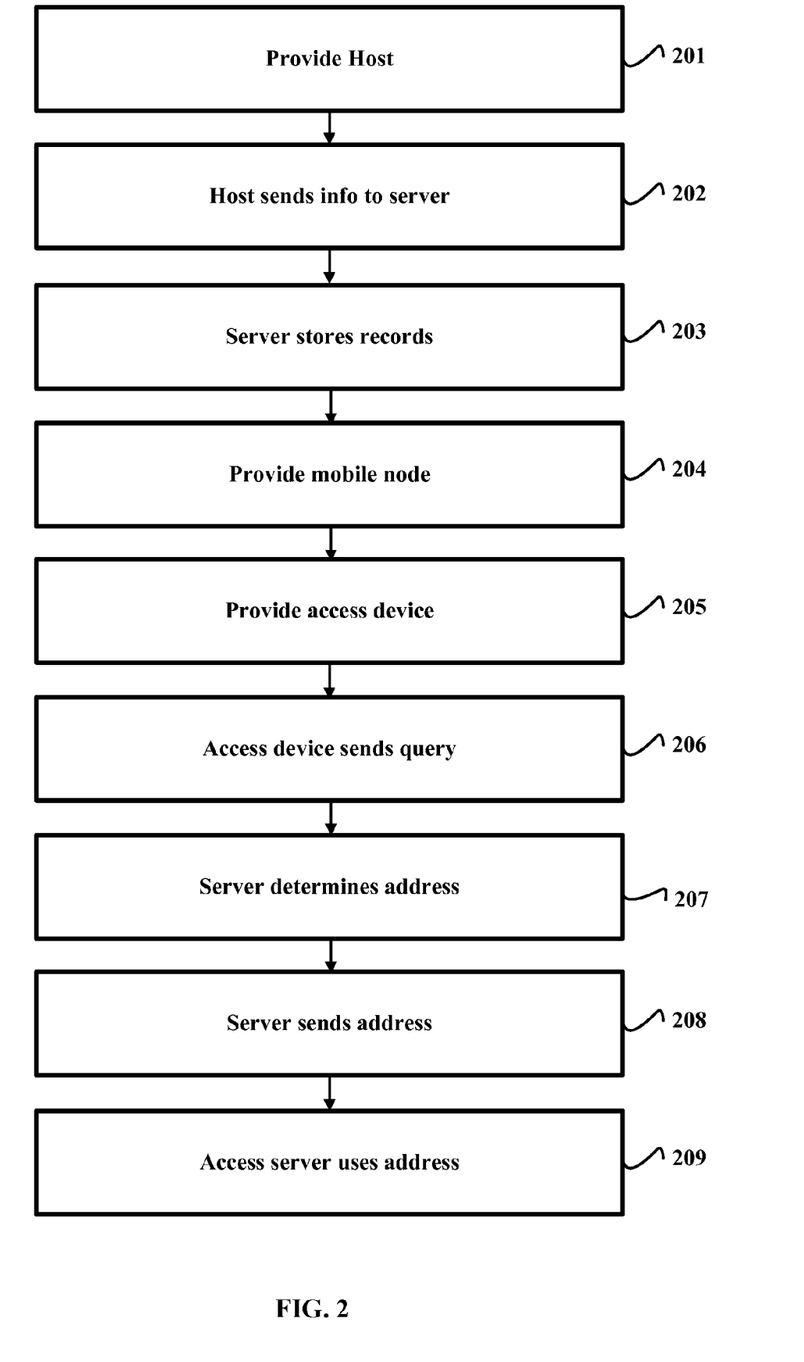
FIG. 2 is a simplified flow diagram illustrating a process for determining data flow according to an embodiment of the present invention.

FIG. 2 is a simplified flow diagram illustrating a process for determining data flow according to an embodiment of the present invention. This diagram is merely an example, which should not unduly limit the scope of the claims. One of ordinary skill in the art would recognize many variations, alternatives, and modifications. For example, various steps as shown may be added, removed, modified, At step 201, a host is provided. For example, the host is the host 104 shown in FIG. 1. The host has multiple interfaces and corresponding addresses for each of the interfaces. According to an embodiment, each of the interfaces is associated with a specific type of application, such as FTP, web, VoIP, etc. For example, the host has a FTP interface that allows it to provide FTP related data transfers. The interface for FTP is associated with an IP address. For example, the IP address is one of the multiple CoA for the host. When FTP related data transfer is performed at the host, the FTP address for the host is used. In addition to the address itself, the FTP related services and/or transfers are also associated with one or more ports. For example, multiple FTP transfers may be performed at the host, and each of the transfers is associated with a specific port.

At step 202, the host sends information to a server, which stores host records related to data transfer and addresses thereof. For example, the server is the server 103 shown in FIG. 1. Among other things, the information from the host includes at least the multiple addresses corresponding to various applications. In addition, the information may also include QoS information for serving mobile nodes and connecting to networks. In a specific embodiment, the host sends information to the server according to the Mobile IPv6 standard. Merely by way of an example, the information is sent via a universal datagram packet (UDP). According to various embodiments, the host sends information update to the server at predetermined time intervals.

At step 203, the server stores records information for the host. According to embodiments, the server is a DNS server that has a database for storing information for various hosts within a network system. For example, the server stores records information related to the host in a format similar to the records shown in Table 1. Among other things, the records for the host include at least multiple addresses that correspond to various applications. Furthermore, the server may stores additional information, such as interfaces associated with specific applications, network capacity, processing power of a host, as well as port numbers for each of the application. In certain applications, the server dynamically updates record information.

At step 204, the mobile node is provided. For example, a mobile node (e.g., a mobile computer, a cellular phone, a multimedia device, etc.) is capable of communicating and/or interfacing with two or more hosts or networks at the same time. Among other things, the mobile node is able to move one network to another without breaking connectivity. In a particular embodiment, the mobile node uses multiple CoA for data transfers.

At step 205, an access device is provided. For example, the access device is a host that is configured to provide IP connectivity to the mobile node and is capable of communicating with other hosts. As merely an example, the access device is the host 102 as shown in FIG. 2. The access device, among other things, provides IP connectivity to the mobile node. For example, the access device is a correspondence node in compatible with the Mobile IPv6 standard. In addition to providing the IP connectivity to the mobile node, the access device is connected to the host via multiple interfaces. For example, the access device is connected a FTP interface of the host using one address and is connected to a web interface of the host using another address.

At step 206, the access device sends a query to the server to obtain information related to transferring one or more data packet to the host. For example, the query is related to communicating with the host (e.g., which interface to use, what address to use, etc.). According to an embodiment, the query is sent using a UDP in accordance with the Mobile IPv6 standard. For example, the query provides information as what type of data is to be transfer, thereby requesting the appropriate address and/or interface to use.

At step 207, the server determines an address in response to the request. In a specific embodiment, the server determines the address by looking up the records stored at the server and performs a matching process. Merely as an example, the server stores information as shown in Table 1 as internal records. The query requests an address from the server for establish an interface with the host for web related applications. The server looks up the records and determines that the address 129.128.128.2 should be used, as this address is according to the record is for web related applications. In addition, the servers may determine other related information (e.g., port numbers, communication protocols, etc.).

At step 208, the server sends the address (and/or other information) to the access device. For example, the server sends the address in accordance with the Mobile IP protocol. According to embodiments, the server also sends other related information, such as QoS information, port numbers, etc.

At step 209, the access device uses the address provided by the server for data transmission. For example, the access device uses the address 129.128.128.2 and the interface thereof for web applications when serving the mobile node. When the mobile node requests a different type of service, the access device sends a different query to the server.

Figure 3:
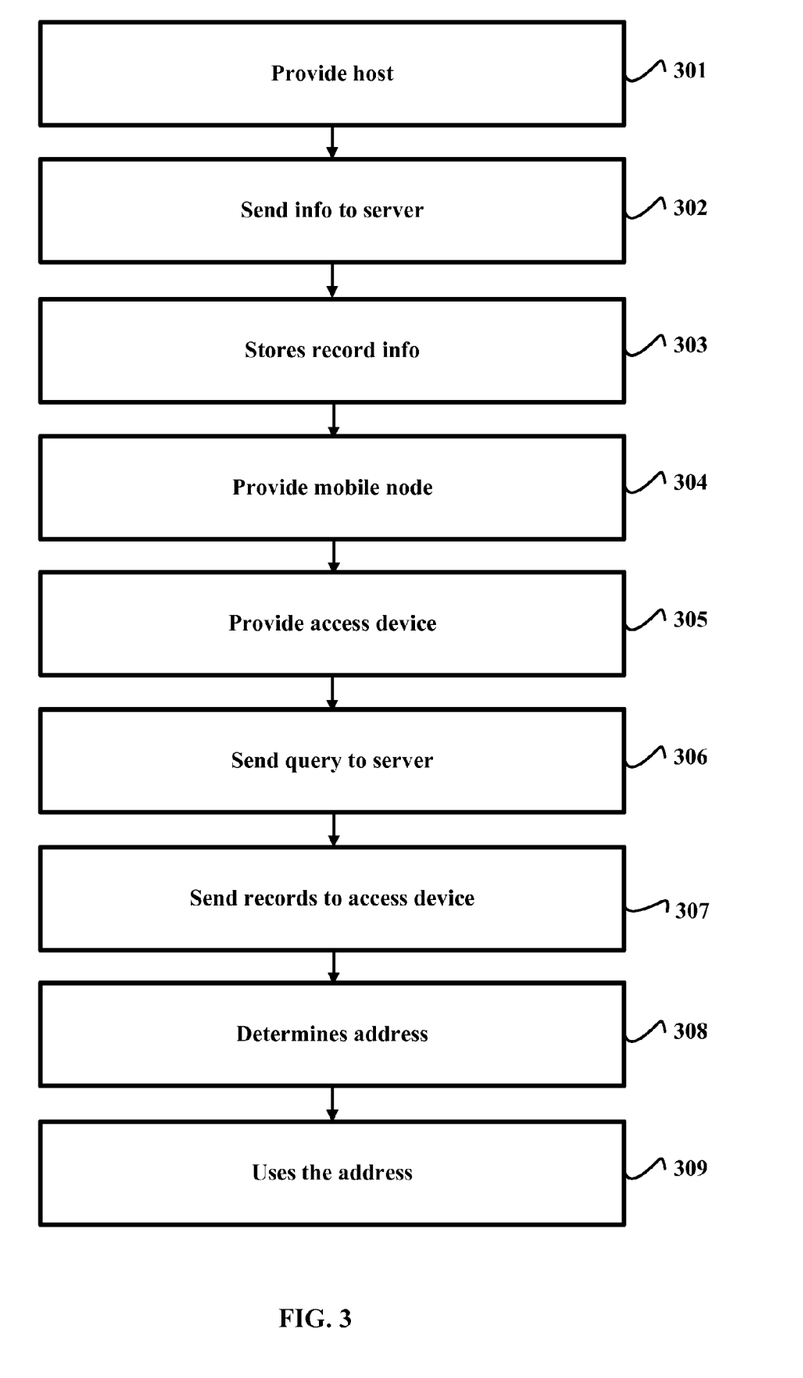
FIG. 3 is a simplified flow diagram illustrating a process for determining data flow according to an embodiment of the present invention.

FIG. 3 is a simplified flow diagram illustrating a process for determining data flow according to an embodiment of the present invention. This diagram is merely an example, which should not unduly limit the scope of the claims. One of ordinary skill in the art would recognize many variations, alternatives, and modifications. For example, various steps as shown may be added, removed, modified, At step 301, a host is provided. For example, the host is the host 104 shown in FIG. 1. The host has multiple interfaces and corresponding addresses for each of the interfaces. According to an embodiment, each of the interfaces is associated with a specific type of application, such as FTP, web, VoIP, etc. For example, the host has a FTP interface that allows it to provide FTP related data transfers. The interface for FTP is associated with an IP address. For example, the IP address is one of the multiple CoA for the host. When FTP related data transfer is performed at the host, the FTP address for the host is used. In addition to the address itself, the FTP related services and/or transfers are also associated with one or more ports. For example, multiple FTP transfers may be performed at the host, and each of the transfers is associated with a specific port.

At step 302, the host sends information to a server, which stores host records related to data transfer and addresses thereof. For example, the server is the server 103 shown in FIG. 1. Among other things, the information from the host includes at least the multiple addresses corresponding to various applications. In addition, the information may also include QoS information for serving mobile nodes and connecting to networks. In a specific embodiment, the host sends information to the server according to the Mobile IPv6 standard. Merely by way of an example, the information is sent via a UDP. According to various embodiments, the host sends information update to the server at predetermined time intervals.

At step 303, the server stores records information for the host. According to embodiments, the server is a DNS server that has a database for storing information for various hosts within a network system. For example, the server stores records information related to the host in a format similar to the records shown in Table 1. Among other things, the records for the host include at least multiple addresses that correspond to various applications. Furthermore, the server may stores additional information, such as interfaces associated with specific applications, network capacity, processing power of a host, as well as port numbers for each of the application. In certain applications, the server dynamically updates record information.

At step 304, the mobile node is provided. For example, a mobile node (e.g., a mobile computer, a cellular phone, a multimedia device, etc.) is capable of communicating and/or interfacing with two or more hosts or networks at the same time. Among other things, the mobile node is able to move one network to another without breaking connectivity. In a particular embodiment, the mobile node uses multiple CoA for data transfers.

At step 305, an access device is provided. For example, the access device is a host that is configured to provide IP connectivity to the mobile node and is capable of communicating with other hosts. As merely an example, the access device is the host 102 as shown in FIG. 2. The access device, among other things, provides IP connectivity to the mobile node. For example, the access device is a correspondence node in compatible with the Mobile IPv6 standard. In addition to providing the IP connectivity to the mobile node, the access device is connected to the host via multiple interfaces. For example, the access device is connected a FTP interface of the host using one address and is connected to a web interface of the host using another address.

At step 306, the access device sends a query to the server to obtain information related to transferring one or more data packet to the host. For example, the query is related to communicating with the host (e.g., which interface to use, what address to use, etc.). According to an embodiment, the query is sent using a UDP in accordance with the Mobile IPv6 standard. For example, the query provides information as what type of data is to be transfer, thereby requesting the appropriate address and/or interface to use.

At step 307, the server sends various records of the host to the access device. According to an embodiment, sends all the records that are related to the host to the access device. According to an embodiment, records are sent in accordance with the Mobile IP protocol. As an example, the records are the one shown in Table 1 that are related to the host.

At step 308, the access device determines an address using the records. For example, the address is determined based on the application type. In a specific embodiment, the access device determines the address by looking up the records sent from the server and performs a matching process. For example, the query requests an address from the server for establish an interface with the host for web related applications. The access devices looks up the records sent from the server and determines that the address 129.128.128.2 should be used, as this address is according to the record is for web related applications. In addition, the access device may determine other related information (e.g., port numbers, communication protocols, etc.).

At step 209, the access device uses the address provided by the server for data transmission. For example, the access device uses the address 129.128.128.2 and the interface thereof for web applications when serving the mobile node. When the mobile node requests a different type of service, the access device sends a different query to the server.

According to an embodiment, the present invention provides a method for providing network connections. The method includes providing a first host. The first host includes a plurality of interfaces. The plurality of interfaces includes at least a first interface and a second interface. The first interface is associated with at least a first application. The second interface is associated with at least a second application. The method also includes storing a plurality of records at a server. The plurality of records is associated with the first host. The plurality of records includes a first record and a second record. The first record includes at least information associated with a name of the first host, the first interface, the first application, a first address of the first interface. The second record includes at least information associated with the second interface, the second application, a second address of the second interface. The method further includes providing a second host, the second host being configured to send a first packet data through a session interface of the first host. The first packet data is associated with at least a third application. The method also includes sending a query from the second host to the server. The query is related to determine the session interface for sending the first packet data. In addition, the method includes determining the session interface in response to the query based at least on the third application. For example, the embodiment is illustrated according to FIG. 1.

According to another embodiment, the present invention provides a system for providing network connections. The system includes a first host that includes a plurality of interfaces. The plurality of interfaces includes at least a first interface and a second interface. The first interface is associated with at least a first application. The second interface is associated with at least a second application. The system also includes a server that is configured to store a plurality of records. The plurality of records is associated with the first host. The plurality of records includes a first record and a second record. The first record includes at least information associated with a name of the first host, the first interface, the first application, a first address of the first interface. The second record includes at least information associated with the second interface, the second application, a second address of the second interface. The system also includes a second host that is configured to send a first packet data through a session interface of the first host. The first packet data is associated with at least a third application. The second host sends a query to the server, the query being related to determine the session interface for sending the first packet data. The server send a response to the second host, the response including information associated with at least the first host. The second host determines the session interface using based on the response. For example, the embodiment is illustrated according to FIGS. 1 and 3.

According to yet another embodiment, the present invention provides a system for providing network connections. The system includes a first host that includes a plurality of interfaces. The plurality of interfaces includes at least a first interface and a second interface. The first interface is associated with at least a first application. The second interface is associated with at least a second application. The system also includes a server that is configured to store a plurality of records. The plurality of records is associated with the first host. The plurality of records includes a first record and a second record. The first record includes at least information associated with a name of the first host, the first interface, the first application, a first address of the first interface. The second record includes at least information associated with the second interface, the second application, a second address of the second interface. The system also includes a second host that is configured to send a first packet data through a session interface of the first host. The first packet data is associated with at least a third application. The second host sends a query to the server, the query being related to determine the session interface for sending the first packet data. The server determines the session interface in response to the query based at least on the third application using the plurality of records. For example, the embodiment is illustrated according to FIGS. 1 and 2.

It is to be appreciated that the various embodiments of the present invention provide advantages over conventional techniques. In various embodiments, the present invention provides a scheme for efficiently routing data to corresponding interfaces of a server. In a specific embodiment, the present invention provides a method in which a DNS server determines the appropriate interfaces and address for routing data based at least on the data to be routed. In addition, it is to be appreciated that embodiments of the present invention can be implemented for conventional network techniques and standards (e.g., the Mobile IPv6 standard). For example, various embodiments of the present invention are compatible with conventional techniques and easily implemented. There are other benefits as well.

It is also understood that the examples and embodiments described herein are for illustrative purposes only and that various modifications or changes in light thereof will be suggested to persons skilled in the art and are to be included within the spirit and purview of this application and the scope of the appended claims.

What is claimed is:

1. A method for providing network connections, the method comprising:

providing a first host, the first host including a plurality of interfaces, the plurality of interfaces including at least a first interface and a second interface, the first interface being associated with at least a first application, the second interface being associated with at least a second application;

storing a plurality of records at a server, the plurality of records being associated with the first host, the plurality of records including a first record and a second record, the first record including at least information associated with a name of the first host, the first interface, the first application, a first address of the first interface, the second record including at least information associated with the second interface, the second application, a second address of the second interface;
providing a second host, the second host being configured to send a first packet data through a session interface of the first host, the first packet data being associated with at least a third application;
sending a query from the second host to the server, the query being related to determine the session interface for sending the first packet data;
determining the session interface in response to the query based at least on the third application.

2. The method of claim 1 further comprising providing a connection between the first host and the second host.

3. The method of claim 1 wherein the first interface comprises a plurality of ports.

4. The method of claim 1 further comprising sending information associated with the first interface and the second interface from the first host to the server.

5. The method of claim 1 further comprising sending a response from the server to the second host.

6. The method of claim 1 wherein the query being in compliance with a User Datagram Protocol (UDP).

7. The method of claim 1 further comprising providing an address associated with the session interface.

8. The method of the claim 1 wherein the determining the session interface comprises:
looking up the records by the server;
providing the first address if the third application matches the first application.

9. The method of the claim 1 wherein the determining the session interface comprises:
sending the records from the server to the second host;
determining that an address for the session interface by the second host is the first address if the third application matches the first application.

10. The method of claim 1 wherein the server comprises a domain name server.

11. The method of claim 1 wherein the first host is compatible with a Mobile IPv6 protocol.

12. A system for providing network connections, the system comprising:
a first host, the first host including a plurality of interfaces, the plurality of interfaces including at least a first interface and a second interface, the first interface being associated with at least a first application, the second interface being associated with at least a second application;
a server, the server being configured to store a plurality of records, the plurality of records being associated with the first host, the plurality of records including a first record and a second record, the first record including at least information associated with a name of the first host, the first interface, the first application, a first address of the first interface, the second record including at least information associated with the second interface, the second application, a second address of the second interface;
a second host, the second host being configured to send a first packet data through a session interface of the first host, the first packet data being associated with at least a third application;
wherein:
the second host sends a query to the server, the query being related to determine the session interface for sending the first packet data;
the server send a response to the second host, the response including information associated with at least the first host;
the second host determines the session interface using based on the response.

13. The system of claim 12 wherein:
the response including at least a record information associated with the first host;
the second host determines the session interface address comparing the third application with the record information.

14. The system of claim 12 wherein the second host comprises a correspondent node.

15. The system of claim 12 further comprises a mobile node, the mobile node being wirelessly connected to the second host.

16. The system of claim 12 further comprising a content network, the content network being connected to the first host.

17. The system of claim 12 wherein the second host comprises an access router.

18. The system of claim 12 wherein the second host comprises a base station.

19. The system of claim 12 wherein the second host is configured to provide radio access to a mobile node.

20. A system for providing network connections, the system comprising:
a first host, the first host including a plurality of interfaces, the plurality of interfaces including at least a first interface and a second interface, the first interface being associated with at least a first application, the second interface being associated with at least a second application;
a server, the server being configured to store a plurality of records, the plurality of records being associated with the first host, the plurality of records including a first record and a second record, the first record including at least information associated with a name of the first host, the first interface, the first application, a first address of the first interface, the second record including at least information associated with the second interface, the second application, a second address of the second interface;
a second host, the second host being configured to send a first packet data through a session interface of the first host, the first packet data being associated with at least a third application;
wherein:
the second host sends a query to the server, the query being related to determine the session interface for sending the first packet data;
the server determines the session interface in response to the query based at least on the third application using the plurality of records.

21. The system of claim 20 wherein the server comprises a DNS server.

22. The system of claim 20 further comprising a mobile node connected to the second host.

23. The system of claim 22 wherein the mobile node comprises a laptop computer.

24. The system of claim 22 wherein the mobile node comprises a personal digital assistant.

25. The system of claim 20 wherein the second host comprises a mobile server.

26. The system of claim 20 wherein the first host being in compliance with a Mobile IPv6 protocol.

27. The system of claim 20 wherein the first application comprises a voice-over-IP application.

28. The system of claim 20 wherein the first application comprises a file transfer protocol application.

29. The system of claim 20 wherein the first application comprises a web application.

* * * * *